United States Patent [19]
Williamson et al.

[11] Patent Number: 5,467,240
[45] Date of Patent: Nov. 14, 1995

[54] DRIVER CIRCUIT WITH DIAGNOSTICS AND OVER VOLTAGE PROTECTION

[75] Inventors: Gregory L. Williamson; Mark R. Hawkins, both of Chillicothe; William J. Tate, Peoria, all of Ill.

[73] Assignee: Caterpillar Inc., Peoria, Ill.

[21] Appl. No.: 129,506

[22] Filed: Sep. 30, 1993

[51] Int. Cl.[6] .................................................. H02H 7/20
[52] U.S. Cl. ................................ 361/18; 361/86; 323/276
[58] Field of Search ............................ 361/91, 86, 18, 361/111, 78–79, 88; 363/56; 323/276

[56] References Cited

U.S. PATENT DOCUMENTS

| | | | |
|---|---|---|---|
| 4,373,697 | 2/1983 | Phelps | 251/129 |
| 4,628,397 | 12/1986 | Gareis et al. | 361/98 |
| 4,845,975 | 7/1989 | Kyrtsos et al. | 73/11 |
| 4,979,066 | 12/1990 | Kawata et al. | 361/18 |

Primary Examiner—Todd DeBoer
Assistant Examiner—Michael J. Sherry
Attorney, Agent, or Firm—James R. Yee

[57] ABSTRACT

The present invention provides a general purpose driver circuit. The driver circuit is connected to a load. The driver circuit includes a controller for producing a control signal indicative of a desired output current. The driver circuit generates an output current having a magnitude responsive to the magnitude of the control signal. The driver circuit produces a system voltage feedback signal and an output voltage feedback signal and responsively performs output load condition diagnostics.

12 Claims, 6 Drawing Sheets

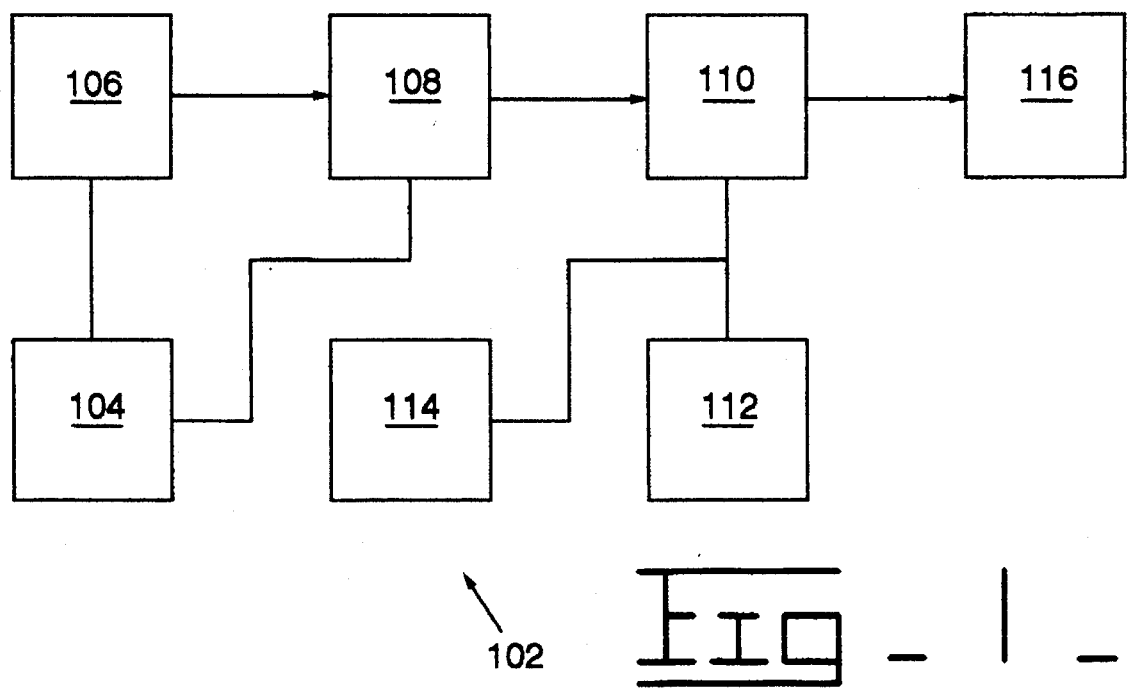
Fig_1_
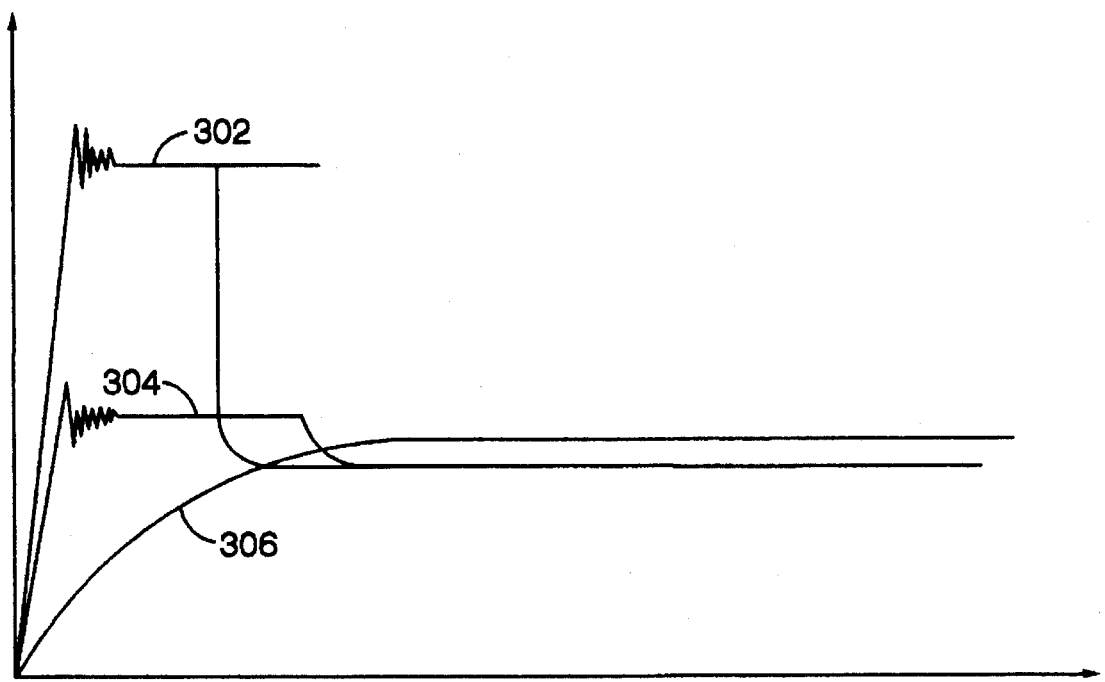
Fig_3_

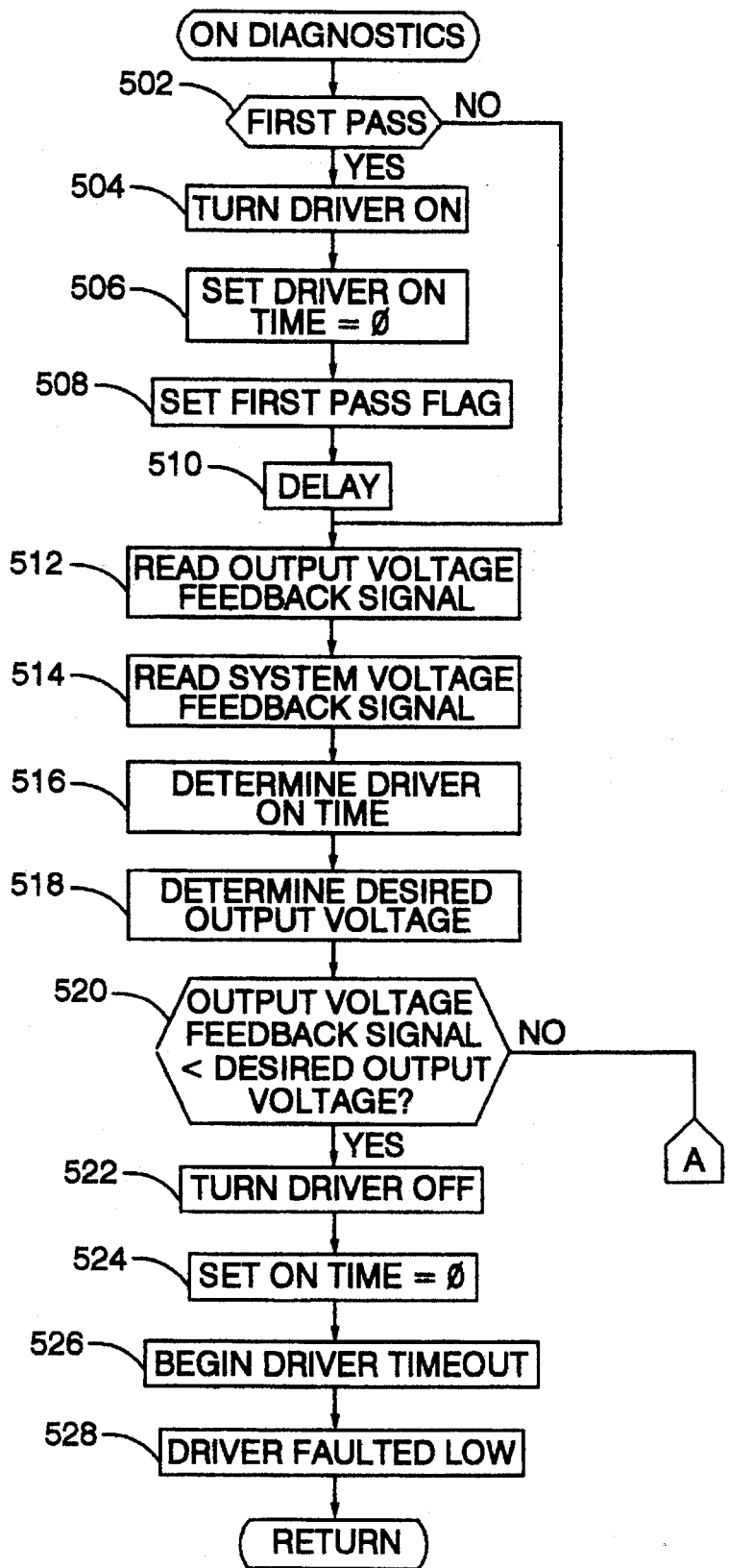
Fig_5_

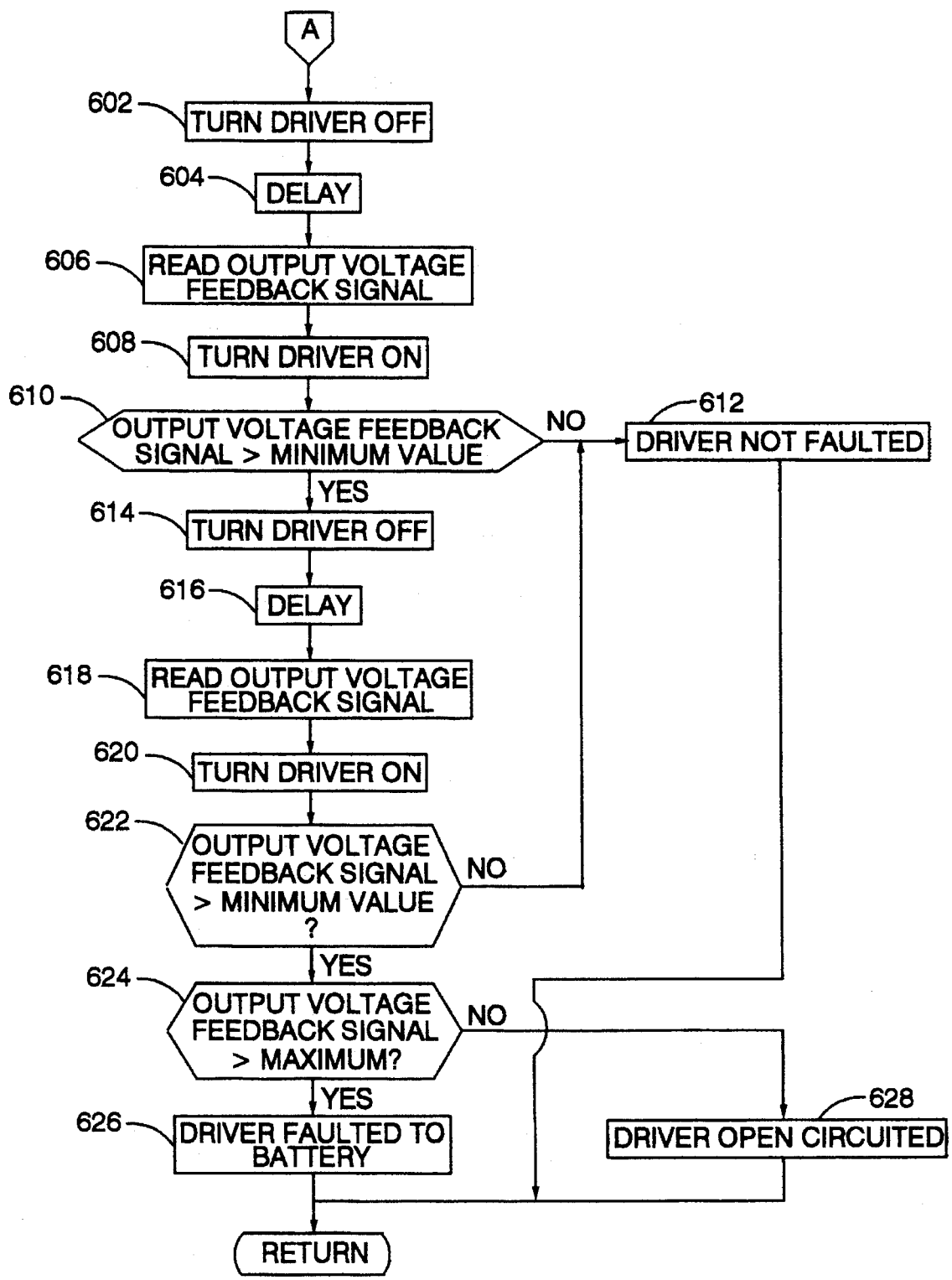

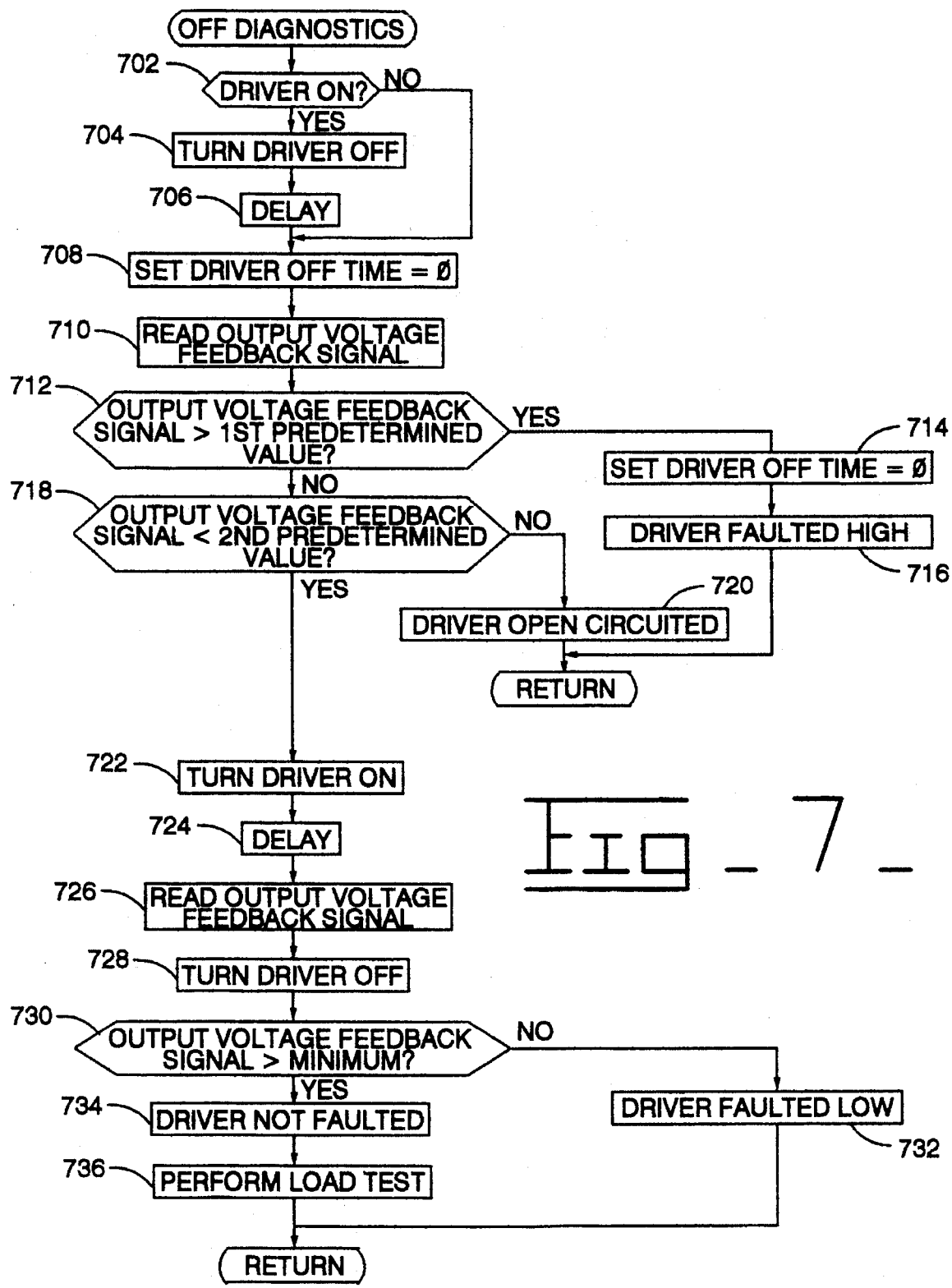

5,467,240

DRIVER CIRCUIT WITH DIAGNOSTICS AND OVER VOLTAGE PROTECTION

TECHNICAL FIELD

This invention relates generally to a general purpose driver circuit and more particularly to a diagnostic scheme for a general purpose driver circuit.

BACKGROUND ART

Incandescent lamps have many uses in the field of earthmoving or construction equipment. For example, they may be used to provide illumination, to enable the operator to drive a vehicle or to operate a work implement. Another use of incandescent lamps in the earthmoving and construction industries is to provide visual indications of the status of a vehicle or operation.

For example, in U.S. Pat. No. 4,845,975 issued to Christos T. Kyrtsos et al on Jul. 11, 1989, a pair of incandescent lamps provide an indication of the loading condition of an off-highway truck relative to rated capacity. The lamps are placed such that they are viewable by the operator of the loading vehicle, e.g., a wheel loader.

These lamps are mounted on the off-highway truck and must be large enough to be readily seen by the operator of the loading vehicle. Large lamps require large driving currents. Because of the requirement for large currents, the driver circuits for the lamps must consist of large current capacity components, making the driver circuits bulky and expensive.

Additionally, the driver circuits must be protected from external faults, e.g., faults to battery, open circuits, and faults to ground. It is also desirable to detect such faults. Typically such protection and detection is accomplished by additional circuitry. The additional circuitry detects certain conditions of the driver circuit and shuts the driver off or isolates the driver circuit. The additional circuitry also adds to the size and expense of the driver circuit.

The present invention is directed at solving one or more of the problems as set forth above.

DISCLOSURE OF THE INVENTION

In one aspect of the present invention a driver circuit is provided. The driver circuit is connected to a load. The driver circuit includes a controller for producing a control signal indicative of a desired output current. The driver circuit generates an output current having a magnitude responsive to the magnitude of the control signal. The driver circuit produces a system voltage feedback signal and an output voltage feedback signal and responsively performs output load condition diagnostics.

BRIEF DESCRIPTION OF THE DRAWINGS

FIG. 1 is a blocked diagram of the driver circuit of the present invention;

FIG. 3 is an illustration of representational current and voltage wave forms;

FIG. 5 is a first portion of the driver ON diagnostics routine of FIG. 4;

FIG. 6 is a second portion of the driver ON diagnostics routine of FIG. 4; and,

FIG. 7 is a flow diagram of the driver OFF diagnostics routine of FIG. 4.

BEST MODE FOR CARRYING OUT THE INVENTION

With reference to FIG. 1, the present invention or driver circuit 102 includes a controlling means 104. The controlling means produces a control signal. The control signal is indicative of the magnitude of the desired output current. In the preferred environment, the controlling means 104 is microprocessor based.

Figure 2:
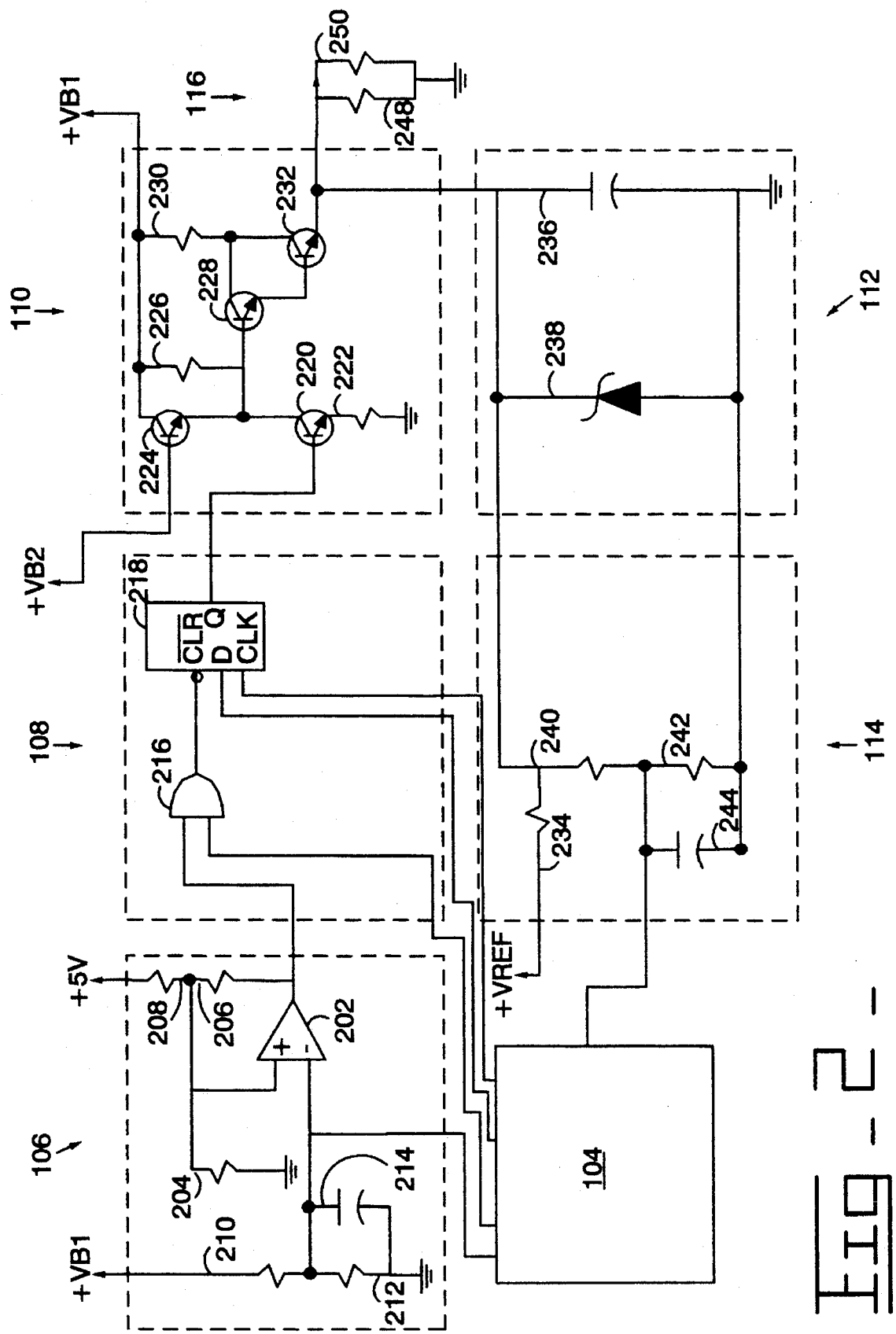
FIG. 2 is a schematic of the driver circuit of FIG. 1.

A logic means 108 receives the control signal and responsively produces a current signal. With reference to FIG. 2 in the preferred embodiment, the logic means includes an AND gate 216. An input of the AND gate 216 is connected to the controlling means 104. The logic means 108 also includes a flip flop 218. The output of the AND gate 216 is connected to the clear input ($\overline{CUR}$) of the flip flop 218. The CLK input of the flip flop 218 is connected to the controlling means 104. The D input is also connected to the controlling means 104. The current signal is the output of the flip flop 218 (Q).

Returning to FIG. 1, a driving means 110 receives the current signal and responsively generates an output current having a magnitude responsive to the magnitude of the control signal. As shown in FIG. 2, the driving means 110 includes a first transistor 220. The base of the first transistor 220 is connected to the output terminal of the flip flop 218. A sixth resistor 222 is connected between the emitter of the first transistor 220 and electrical ground.

The driving means 110 also includes a second transistor 224. The emitter of the second transistor 224 is connected to the collector of the first transistor 220. The base of the second transistor 224 is connected to a second system voltage (+VB2). The collector of the second transistor 224 is connected to system voltage (+VB1). A seventh resistor 226 is connected between the collector and the emitter of the second transistor 224.

The driving means 110 further includes a third transistor 228. The base of the third transistor 228 is connected to the emitter of the second transistor 224. An eighth resistor 230 is connected between the collector of the second transistor 224 and the collector of the third transistor 228. The base of a fourth transistor 232 is connected to the emitter of the third transistor 228. The collector of the fourth transistor 232 is connected to the collector of the third transistor 228 and the emitter of the fourth transistor 232 is connected to the load 116.

An over voltage detecting means 106 senses system voltage (+VB1) and responsively produces a system voltage feedback signal. The over voltage detecting means compares the system voltage feedback signal with a predetermined voltage reference and responsively protects the driver circuit if the system voltage is greater than the predetermined voltage reference.

With reference to FIG. 2 in the preferred embodiment the over voltage detecting means 106 includes a comparator 202. A first resistor 204 is connected between the positive input terminal of the comparator 202 and electrical ground. A second resistor 206 is connected between the output terminal and the positive input terminal of the comparator 202. A third resistor 208 is connected between the positive input terminal of the comparator 202 and positive 5 volts. A fourth resistor 210 is connected between the negative input terminal of the comparator 202 and system voltage (+VB1). A fifth resistor 212 is connected between the negative input terminal of the comparator 202 and electrical ground. A first capacitor is connected in parallel with the fifth resistor 212. The negative input terminal of the comparator 202 is connected to the controlling means 104. The voltage seen at the negative input terminal is equal to the system voltage feedback signal.

A means 112 connected to the driving means 110 and the load 116 protects the driver circuit 102 from electrostatic discharge, external electrical short circuit, and electromagnetic interference (EMI). With reference to FIG. 2, the protection means 112 includes a second capacitor 236 and a Zener diode 238.

A means 114 senses the magnitude of the output voltage relative to electrical ground and responsively produces an output voltage feedback signal. With reference to FIG. 2 in the preferred embodiment, the output voltage feedback means 114 includes a ninth resistor 234 connected between the emitter of the fourth transistor 232 and a voltage reference (+VREF). A tenth resistor 240 is connected at one end to the emitter of the fourth transistor 232 and to an eleventh resistor 242 at the other end. The eleventh resistor 242 is connected between the tenth resistor 240 and electrical ground. A third capacitor 244 is connected in parallel with the eleventh resistor 242. The juncture between the tenth and eleventh resistors 240,242 is connected to the controller 104. The output voltage feedback signal is equal to the voltage across the eleventh resistor and the third capacitor 242,244.

In the preferred embodiment, the controlling means 104 is microprocessor based. In one embodiment the controlling means 104 contains two microprocessors, for example, a Motorola Model No. 68000 and a Motorola Model No. 68HC11. Preferably, the controlling means 104 is the main module in a vital information management system (VIMS). The Motorola 68000 performs the main functions of the VIMS main module. The Motorola 68HC11 is a slave microprocessor to the Motorola MC 68000 and performs communication routines and the diagnostic routines (described below).

In the preferred embodiment, the slave processor controls the driver circuit 102 through the logic means 108. The slave processor is connected to the D and CLK inputs of the flip flop 218. The logic means 108 is adapted to turn on the driving means 110 when the D input is high. The logic means 108 also resets the driver circuit 102 through an input to the AND gate 216.

In the preferred embodiment, the driver is designed to begin driving the load with a lower current than normally experienced during lamp in-rush. With reference to FIG. 3, large incandescent lamps are typically turned on by a rapidly increasing in-rush current 302. The current increases to a large value and remains at a high level for a short period of time and then drops to a lessor value as the lamp filament warms up. In contrast the driver circuit of the present invention allows the lamp to warm up more slowly by delivering a current 304 which is limited at a lessor value. The voltage 306 across the lamp also rises at a slower rate. This has the effect of decreasing the stress on the load and increasing the lamp's life.

The over voltage detecting means 106 protects the driver circuit 102 from system over voltages. The output of the comparator 202 is connected to the other input of the AND gate 216. The output of the AND gate 216 is connected to the CLR input of the flip flop 218. When either of the AND gates inputs goes low the flip flop is reset and the driving means 110 is shut off. With reference to FIGS. 4–7, the diagnostic scheme will now be discussed.

Figure 4:
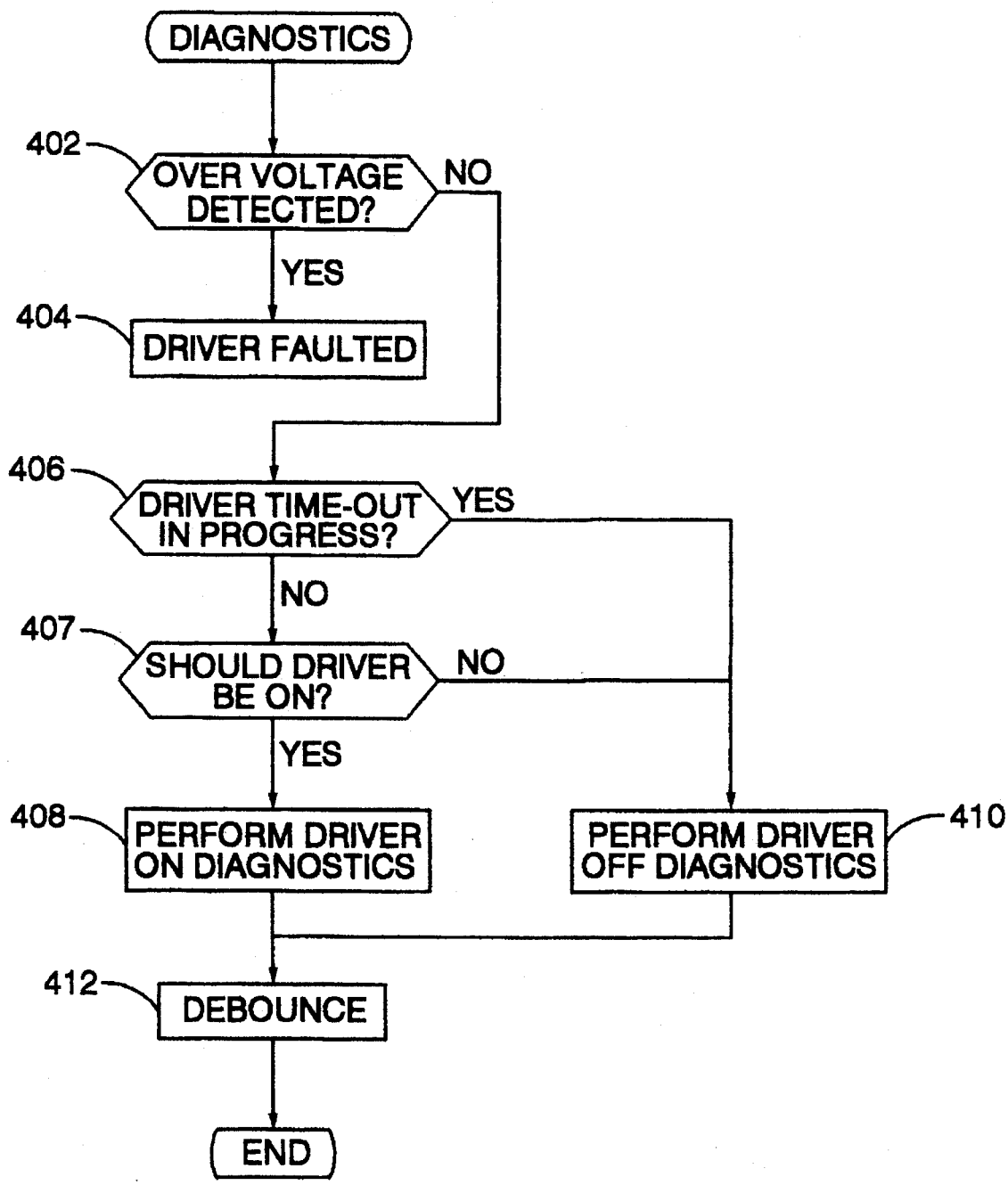
FIG. 4 is a flow diagram of the diagnostics of the driver circuit including a driver ON diagnostics routine and a driver OFF diagnostics routine.

In FIG. 4, the general flow diagram of the diagnostics is illustrated. In a first decision block 402, if the over voltage detecting means 106 has detected a large system voltage (+VB1) and shut off the driver circuit, then control goes to a first control block 404. In the preferred embodiment, the output of the AND gate 216 is connected to the input (D) of another flip flop (not shown). If an over voltage is detected, the output of the AND gate 216 goes from HIGH to LOW, causing the flip flop to change states. The controlling means 104 reads the output of the flip flop to determine if an over voltage has been detected. In the first control block 404, the driver is deemed to be faulted and the diagnostics routine ends.

If an over voltage has not been detected, then control goes to a second decision block 406. If a driver time-out is in progress then control goes to a second control block 410. In the second control block 410 the OFF diagnostics are performed. If the driver time-out is not in progress then control goes to a third decision block 407. In the third decision block 407, if the driver should be on, then control goes to a third control block 408. In the third control block 408 the ON diagnostics are performed. If the driver is not supposed to be on then control goes to the second control block 410.

In a fourth control block 412 a debouncing routine is performed. The debouncing routine tracks the number of each type of fault that is detected, that is, faults to high or battery, faults to ground, or open circuits. In the preferred embodiment, a counter for each type of fault is used. Each counter initially is set to a predetermined value, for example 5 or 10. Each time a certain fault is detected the respective counter is decremented.

The debouncing routine filters out the diagnostic results to eliminate erroneous fault conditions. In order for a true fault to be detected, the diagnostic routine must detect it for at least a number of times equal to the predetermined value (5 or 10). In the preferred embodiment, the diagnostic routine executes every 10 milliseconds. Each control loop, in which a fault is not detected, the counters are incremented by one. For example, if the counters are initially set at 5 and the diagnostic routines detect a fault to battery condition three control loops in a row the fault to battery counter will have been decremented to two. If after the next control loop a fault to battery is not detected, then the fault to battery counter is incremented by one. At this point the fault to battery counter is equal to three. If a fault to battery condition is detected during each of the next three control loops, the fault to battery counter will be equal to zero. At this point the controlling means registers the fault as a true fault.

With reference to FIGS. 5 and 6, the ON diagnostic routine will now be discussed. In a fourth decision block 502 if this is a first pass with the driver on then control goes to a fifth control block 504. In the fifth control block 504 the driver is turned on. In a sixth control block 506, the driver on time is set equal to zero. In a seventh control block 508 the first pass flag is set. In a eighth control block 510 the routine delays for a predetermined time period in order for the driver to turn on. In a ninth control block 512 the output voltage feedback signal is read. If this is not the first pass with the driver on then control goes to the ninth control block 512. In a tenth control block 514 the system voltage feedback signal is read. In an eleventh control block 516 the time that the driver has been on is determined. In a twelfth control block, the magnitude of the desired output voltage as a function of the driver on time as determined. This is a function of the driver circuitry and is determined experimentally. In one embodiment, the desired output voltage is determined via a computer look up table. In a fifth decision block 520, if the output voltage feedback signal is less than the desired output voltage then control goes to a thirteenth control block 522. If the output voltage feedback signal is not less than the desired output voltage then control goes to a seventeenth control block 602. In the thirteenth control block 522 the driver is turned off. In a fourteenth control block 724 the on time of the driver is set equal to zero. In a fifteenth control block 726 drive time-out has begun. Driver time-out is a delay introduced into the system during which the routine will not allow the driver to be turned on. In a sixteenth control block 728 the driver is deemed to be faulted low and the control returns to the main routine.

In the seventeenth control block 602 the driver circuit is turned off. In an eighteenth control block 604 a short delay is initiated. In a nineteenth control block 606 the output voltage feedback signal is read. In a twentieth control block 608 the driver circuit is turned back on. The above few steps turns the driver circuit off for a short delay to check for a normal load since the output voltage of a normally loaded driver circuit will very quickly propagate to a low voltage. The driver circuit is turned back on in case the load is normal. In a sixth decision block 610, if the output voltage feedback signal is greater than a minimum value then control goes to a twenty-second control block 614. If the output voltage feedback signal is not greater than the minimum value then control goes to a twenty-first control block 612. In the twenty-first control block 612, the driver is deemed to be not faulted and control returns to the main routine. In the twenty-second control block 614 the driver circuit is turned off. In a twenty-third control block 616 a delay is initiated. The delay in the twenty-third control block 616 is longer than the delay in the eighteenth control block 604. In a twenty-fourth control block 618 the output voltage feedback signal is read. In a twenty-fifth control block 620 the driver circuit is turned back on. In a seventh decision block 622 if the output voltage feedback signal is greater than a minimum value then control goes to a eighth decision block 624. If the output voltage feedback signal is not greater than the minimum value then the driver is deemed to be not faulted and control returns to the main routine. In the eighth decision block 624 if the output voltage feedback signal is greater than a maximum value then control goes to a twenty-sixth control block 626. In control block 626 the driver is deemed to be faulted to battery and control returns to the main routine. If the output voltage feedback signal is not greater than a maximum value then control goes to a twenty-seventh control block 628. In the twenty-seventh control block 628 the driver is deemed to be open circuited and control returns to the main routine.

With reference to FIG. 7, the OFF diagnostic routine is now discussed. In a ninth decision block 702 if the driver is turned on then control goes to a twenty-eighth control block 704. In the twenty-eighth control block 704 the driver is turned off. In a twenty-ninth control block 706 a delay is initiated. If the driver circuit is not turned on then control goes to a thirtieth control block 708. In the thirtieth control block 708 the driver off time is set equal to zero. In a thirty-first control block 710 the output voltage feedback signal is read. In a tenth decision block 712 if the output voltage feedback signal is greater than a first predetermined value then control goes to a thirty-second control block 714. In the thirty-second control block 714 the driver off time is set equal to zero. In a thirty-third control block 716 the driver is deemed to be faulted to battery and control returns to the main routine.

If the output voltage feedback signal is not greater than the first predetermined value then control goes to an eleventh decision block 718. In the eleventh decision block 718 if the output voltage feedback signal is less than a second predetermined value then control goes to a thirty-fifth control block 722. If the output voltage feedback signal is not less than a second predetermined value then control goes to a thirty-fourth control block 720. In the thirty-fourth control block 720 the driver is deemed to be open circuited and control returns to the main routine.

In the thirty-fifth control block 722 the driver is turned back on. In a thirty-sixth control block 724 a short delay is initiated. In a thirty-seventh control block 726 the output voltage feedback signal is read. In a thirty-eighth control block 728 the driver circuit is turned off. In a thirteenth decision block 730 if the output voltage feedback signal is greater than a minimum value then control goes to a thirty-ninth control block 734. In the thirty-ninth control block 734 the driver is deemed to be not faulted. In a fortieth control block 736 the load test is performed. If the output voltage feedback signal is not greater than a minimum value then control goes to a forty-first control block 732. In the forty-first control block 732, the driver is deemed to be faulted low and control returns to the main routine.

The load test is performed in applications where the load consists of two elements, e.g., two lamps, connected in parallel. Since the driver is producing a constant current, the load resistance can be determined by examining the output voltage of the driver circuit. If the voltage across the load is greater than the "dual lamp" voltage than one of the lamps is deemed to be burned out. This is a result of the resistance of the two lamps in parallel being less than the resistance of one lamp.

INDUSTRIAL APPLICABILITY with reference to the drawings and in operation, the present invention provides current to drive at least one incandescent lamp. The driver circuit is designed to slow ramp up driver current when the driver is turned on. This reduces the stress experienced by the driver circuit components and reduces the maximum current level that the driver circuit must produce.

The driver circuit also provides a hardware/software diagnostic scheme. This design reduces the complexity of the hardware and therefore the need for bulky large current capacity components. In addition, the scheme allows the software portion of the diagnostics to be run in an controller that is already present on the vehicle.

The overall scheme reduces the size and cost of the driver circuit while providing increased flexibility in the diagnostics.

Other aspects, objects, and features of the present invention can be obtained from a study of the drawings, the disclosure, and the appended claims.

We claim:

1. A driver circuit connected to a load, comprising:
   controlling means for producing a control signal, said control signal being indicative of a desired output current;
   logic means for receiving said control signal and responsively producing a current signal;

driving means for receiving said current signal and responsively generating current having a magnitude responsive to the magnitude of said control signal;

over voltage detecting means for sensing system voltage and responsively producing a system voltage feedback signal, comparing said system voltage feedback signal with a predetermined voltage reference and responsively protecting said driver circuit if said system voltage is greater than said predetermined voltage reference, said over voltage detecting means including;
a comparator;
a first resistor connected between the positive input terminal of said comparator and electrical ground;
a second resistor connected between the output terminal and the positive input terminal of said comparator;
a third resistor connected between the positive input terminal of said comparator and +5 volts;
a fourth resistor connected between the negative input terminal of said comparator and system voltage (+VB1);
a fifth resistor connected between the negative input terminal of said comparator and electrical ground;
a first capacitor connected between the negative input terminal of said comparator and electrical ground;

means connected to said driving means and to the load for protecting the driver circuit from external electrical short circuits;

means for sensing the magnitude of the output voltage relative to electrical ground and responsively producing a output voltage feedback signal;

and wherein said controlling means is adapted to receive said system voltage feedback signal, said output voltage feedback signal and responsively perform output load condition diagnostics, said negative input terminal is connected to said controlling means, and said system voltage feedback signal is the voltage at the negative input terminal of said comparator.

2. A driver circuit, as set forth in claim 1, wherein said controlling means is adapted to responsively determine if the load is in a normal or fault condition.

3. A driver circuit, as set forth in claim 1, wherein said controlling means is adapted to responsively determine if the load is in a normal condition or in one of a faulted high, faulted low, or open circuit fault condition.

4. A driver circuit, as set forth in claim 1, wherein said controlling means responsively determines if the load is in a normal or fault condition when the driver circuit is in an OFF state, said controlling means being adapted to compare said system voltage feedback signal and said output voltage feedback signal and responsively produce a FAULTED HIGH condition signal in response to said output voltage feedback signal being substantially equal to said system voltage feedback signal, to compare said output voltage feedback signal to a voltage reference and responsively produce a OPEN CIRCUIT fault condition signal in response to said output voltage feedback signal being substantially equal to said voltage reference.

5. A driver circuit, as set forth in claim 4, wherein controlling means is adapted to on the driver circuit for a brief period if said output voltage feedback signal is substantially equal to electrical ground and to responsively produce a FAULTED LOW signal if said output voltage feedback signal remains substantially equal to ground.

6. A driver circuit, as set forth in claim 1, wherein said controlling means responsively determines if the load is in a normal or fault condition when the driver circuit is in an ON state, said output voltage controlling means being adapted to produce a FAULT TO GROUND condition signal if said output voltage feedback signal is substantially equal to electrical ground.

7. A driver circuit (102), as set forth in claim 6, wherein said controlling means (104) turns OFF said driver for a short period if said output voltage feedback signal is substantially equal to said system voltage feedback signal, said controlling means (104) being adapted to produce a FAULT TO HIGH condition signal if said output voltage feedback signal remains substantially equal to said system voltage feedback signal and to produce an OPEN CIRCUIT condition signal if said output voltage feedback signal is substantially equal to a reference voltage (+VREF).

8. A driver circuit, as set forth in claim 1, wherein said load includes two elements and said driving means being adapted to limit output current at a predetermined value and where said controlling means being adapted to determine load resistance as a function of said output voltage feedback signal and $I_{LIM}$ and wherein said controlling means adapted to sense a fault on one of said elements.

9. A driver circuit, as set forth in claim 1, wherein said logic means includes:
an AND gate having one input connected the output terminal of said operation amplifier and another input connected to said controlling means and
a flip-flop having a clear input connected to the output terminal of the AND gate.

10. A driver circuit, as set forth in claim 9, wherein said driving means includes:
a first transistor having a base connected to the output terminal of said flip-flop;
a sixth resistor connected between the emitter of said first transistor and electrical ground;
a second transistor having an emitter connected to the collector of said first transistor, a base connected to a second system voltage, and a collector connected to system voltage;
a seventh resistor connected between the collector and the emitter of said second transistor;
a third transistor having a base connected to the emitter of the second transistor;
an eighth resistor connected between the collector of said second transistor and the collector of said third transistor;
a fourth transistor having a base connected to the emitter of said third transistor, a collector connected to the collector of said third transistor, and an emitter connected to the load.

11. A driver circuit, as set forth in claim 10, wherein said protecting means includes a second capacitor and a Zener diode connected in parallel between the load and electrical ground.

12. A driver circuit, as set forth in claim 11, wherein said output voltage feedback means includes:
a ninth resistor connected between the emitter of said fourth transistor and a voltage reference;
a tenth resistor connected at one end to the emitter of said fourth transistor;

an eleventh resistor connected between the other end of the tenth resistor and electrical ground;

a third capacitor connected in parallel with said eleventh resistor; and wherein the juncture between said tenth and eleventh resistors is connected to said controlling means and output voltage feedback signal is the voltage across said eleventh resistor.

* * * * *